UNITED STATES PATENT OFFICE.

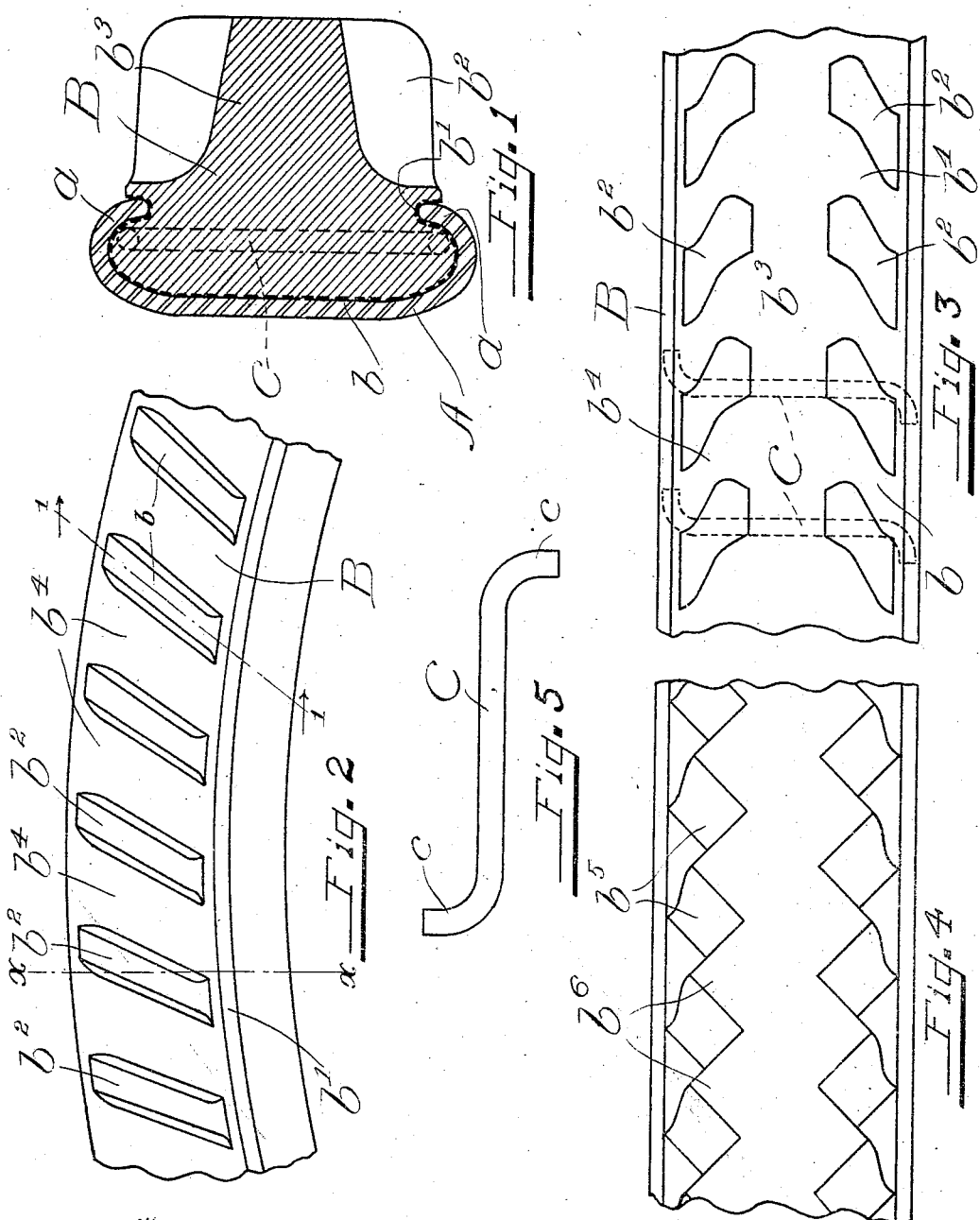

ALVARO S. KROTZ, OF JANESVILLE, WISCONSIN.

CUSHION-TIRE.

1,175,154.   Specification of Letters Patent.   Patented Mar. 14, 1916.

Application filed August 16, 1913. Serial No. 785,137.

*To all whom it may concern:*

Be it known that I, ALVARO S. KROTZ, a citizen of the United States of America, and resident of Janesville, Rock county, Wisconsin, have invented a certain new and useful Improvement in Cushion-Tires, of which the following is a specification.

My invention relates to vehicle wheels of that kind in which the tire comprises a solid body of rubber or other resilient material seated in a rim secured to the felly of the wheel.

It relates more particularly to wheels of this character in which the tire is of the clencher type, being retained in place by means engaging the inturned flanges of the rim.

My invention is chiefly concerned with the formation of the tread portion of the tire, and the means for removably holding the tire in place. The formation of a tire of this kind is an important consideration, inasmuch as this determines to a large extent the life, resiliency and other desirable characteristics thereof. Also, the manner in which the tire is held in place is of vital importance, for the reason that the tire must not only be securely held against displacement, but must also be removable at will and with as little inconvenience as possible. It is to these features, therefore, which are always serious problems in the designing of a serviceable and satisfactory rubber tired wheel, that my invention more especially relates.

Generally stated, the object of my invention is to provide a novel and highly efficient vehicle wheel tire of the foregoing general character.

A special object is to provide an improved form of so-called notch tire in which the lateral notches or recesses are tangential instead of radial, which latter is the formation employed in my prior Patent No. 763909, it having been discovered by me that the tire is more resilient when the notches are disposed tangentially, as this combines flexion and elasticity with compression, when the tire is in action, thus giving it a greater degree of resiliency, as will hereafter more fully appear.

Another object is to provide the tire with a retaining means of such character that compression thereof transversely of the tire, or skewing or angling thereof, will enable the same to pass in and out of the channel rim in which the clencher tire of this kind is ordinarily held, and which, in a case of this kind, for certain purposes, is made in one piece, or of several pieces rigidly secured together, whereby the tire must be compressed or manipulated in order to permit seating and unseating thereof relative to the channel of said rim, and in order to permit it to pass in and out between the inturned flanges thereof.

To these and other useful ends my invention consists in matters hereinafter set forth and claimed.

In the accompanying drawings Figure 1 is a cross section of a cushion tire and rim embodying the principles of my invention, on line 1—1 in Fig. 2. Fig. 2 is a side elevation of a portion thereof. Fig. 3 is a plan of the same. Fig. 4 is a view similar to Fig. 3 but showing a different formation of the tire. Fig. 5 is an enlarged view of one of the retainers which are embedded in the base of the tire to engage the rim and securely hold the tire in place.

As thus illustrated, my invention comprises a rim A of the clench type, provided with inturned flanges $a$ at the sides thereof. The tire B is of solid rubber or other resilient material, being molded to fit the channel of the rim A, and having a reinforcing layer of fabric $b$ around the base thereof. It will be observed that the sides of the tire are provided with grooves $b^1$ for the flanges of the rim. The notches or recesses $b^2$ are disposed tangentially of the wheel, the angle being substantially as shown. Any angle or formation, can be employed, and the size and shape of these recesses can also be changed or varied, if such is necessary or desirable. These notches or recesses begin at the tread of the tire and extend toward the rim, but stop short of the latter, thus leaving a small portion of material over the flange at the bottom of each recess. It will also be seen that the said recesses do not extend to the middle of the tire, but are terminated before reaching the center. With this construction the two series of notches are separated by a central wall $b^3$, which latter, in cross section, is broader at its base than at the tread thereof, as shown in Fig. 1. Preferably, the sides of the tire are flat and parallel, and the tread is also flat, as shown; and the notches or recesses $b^2$ alternate with the ribs $b^4$ formed thereby, which latter are tangential of the wheel. The said ribs and notches are substantially the same in width, and the tire sections formed by these ribs are longer than they are wide—that is to say, their dimensions tangentially is greater than their dimension circumferentially of the wheel.

As shown in Figs. 1 and 2 and 3 the notches or recesses $b^2$ at one side of the tire are opposite those at the other side thereof. If desired, however, the arrangement shown in Fig. 4 can be employed. As shown here, the notches $b^5$ are like those previous described, except that in this case they are saw tooth in shape, looking down on the tread, and are staggered—that is to say, those at one side alternate with those at the other side. Thus the notches $b^5$ and the ribs $b^6$ formed thereby are of the same size and shape. Like the recesses and ribs of Fig. 2, they are tangential in character.

The tire is held in place by the engagement of the base thereof with the clencher rim, in the usual manner; but as a matter of further and special improvement, the displacement of the tire from its seat is prevented by the retainers C which are embedded in the base of the tire, and which have reversely bent end portions $c$ that are presented at opposite sides of the tire. The said retainers are made of wire or short rods, and are of a length to engage and extend under the flanges $a$, thus keeping the tire from pulling out under side thrust. To insert the tire, the retainers C are skewed or angled against the tension of the rubber, until they can pass between the flanges of the rim. Also, and by pushing endwise on these retainers, they are compressed and, in effect, shortened to some extent, inasmuch as each retainer is flexible. The angular adjustment of these retainers, in order to make them stand obliquely, is about axes which are radial of the wheel. This can be done by means of tools or instruments of any suitable character.

The rim A can be of any suitable character. It can be of one piece of metal, or of several pieces, without departing from the spirit of my invention.

With a tire formed as shown, I find that good results are obtained, as the resiliency is increased, and in addition the tire is non-skidding in character. When the tire is compressed between the wheel and the ground, the ribs $b^4$ or $b^6$ are flexed, as well as compressed, as they tend to fold together. Thus flexion is added to compression to make the tire resilient. Also, the displacement of the rubber circumferentially of the wheel, owing to the slant of the notches, is further resisted by the compression of the rubber ahead and the back pull of the rubber behind. Thus the weight of the wheel is opposed by various stresses and forces in the tire, including flexion and compression, and also elasticity of the rubber.

As the spaces $b^2$ or $b^5$, as the case may be, are of a substantial width, and are comparatively close together, it follows that the ribs $b^4$ are in the nature of lateral supports forming well defined projections on the sides of the tire. In other words, the said recesses or spaces form sides for the tire, which sides are set inwardly or toward each other, leaivng the said ribs $b^4$ or $b^6$ projecting outwardly at each side. The tread portion $b^3$ of the tire is, by reason of its proportions, inherently subject to side roll or lateral displacement, but is yieldingly held against such displacement by the supports $b^2$ or $b^6$, depending on the formation of the tire. The supports or projections $b^2$ or $b^5$ are arranged for compression between the ground and base portion of the tire, and the length of each support from base to tread thereof is greater than the width or thickness between spaces. Consequently, and as explained, each support or projection is flexible, and will bend readily in either direction with the longitudinal displacement of the tread portion of the tire, thus yieldingly resisting such displacement.

By inclining the supports $b^2$, and arranging them as shown, they overhang one another, as shown in Fig. 2. Thus there are radial lines of compression, each of which passes through the tread end of one support and then through the base of the next or adjacent support, as illustrated by line X—X in Fig. 2. Thus there are no radial lines which, when viewed from the side, do not pass through at least one of said supports.

It will be seen that the spaces $b^2$ and $b^5$ are disposed at opposite sides of the tread of the tire and arranged in such manner that they are accessible vertically from the ground immediately below. In other words, and when the tire is on the ground, there is then nothing intervening between the said spaces and the ground.

When the tread portion of the tire is under compression, it will be seen that the lateral supports or ribs are not only in contact with the ground at their ends, while traveling over a smooth road surface, but are also brought into contact with the ground at one inner side of each rib, to an extent depending upon the compression of the tire, it being understood that this inner side is the one which faces the next rib. This is because of the tangential arrangement of the said supports or ribs, and it is obvious that should the compression of the tread continue the ribs would be flexed out of their tangential positions to such an extent that the end of each rib would be brought into contact with the adjacent side of the next rib, depending upon the distance between the ribs. As shown, the spacing is such that the said lateral supports form well defined ribs which are separate and distinct from each other, and which do not interfere with each other under ordinary conditions, although they are not so far apart but that they could be brought into contact with each other by extreme compression of the tread portion of the tire.

By reason of the arrangement of the ribs it will be seen that the outer end of each rib, or the end adjacent the tread, is subject with the tread to diminution by wear from contact with the ground. As the tread wears off, the ends of the ribs are also worn off by friction and contact with the ground. Again, it will be seen that the greater the compression of the tread the greater will be the distortion of the ribs directly in contact with a flat ground surface. This is because the ribs will bulge outward and rest more and more on the ground as the weight increases. Should the tire roll to one side the ribs at that side will contact more extensively with the ground, and should the action be carried far enough the ribs would roll entirely under the tread. But the proportions are preferably such, as shown, that the side roll is reduced by the supporting effect of the ribs at opposite sides of the tread.

What I claim as my invention is:

1. A wheel tire comprising a resilient body having a relatively wide base, a tread portion of less width than said base, extending centrally and continuously thereof, subject to lateral displacement when the tire is in action, rib-like supports extending laterally outside of the tread and disposed tangentially along the sides of the tire to yieldingly resist lateral distortion of the tread portion, as well as the longitudinal displacement thereof, said supports being distorted outward and in contact with a flat surface when the tread is under compression thereon, and spaces accessible vertically from the ground immediately below and alternating with said supports to separate the latter along the opposite sides of said tread portion.

2. A wheel tire comprising a resilient body having a relatively wide base, a tread portion of less width than said base, extending centrally and continuously thereof, subject to lateral displacement when the tire is in action, rib-like supports extending laterally outside of the tread and disposed tangentially along the sides of the tire to yieldingly resist lateral distortion of the tread portion, as well as the longitudinal displacement thereof, said supports being subject to distortion and increasing contact with a flat surface when the tire rolls to either side thereon, and spaces accessible vertically from the ground immediately below and alternating with said supports to separate the latter along the opposite sides of said tread portion, arranged to keep the said supports separate while in action between the ground and said base.

3. A wheel tire comprising a resilient body having a relatively wide base, a tread portion of less width than said base, extending centrally and continuously thereof, subject to lateral displacement when the tire is in action, rib-like supports extending laterally outside of the tread and disposed tangentially along the sides of the tire to yieldingly resist lateral distortion of the tread portion, as well as the longitudinal displacement thereof, said supports being arranged for engagement with the ground and spaces accessible vertically from the ground immediately below and alternating with said supports to separate the latter along the opposite sides of said tread portion, the spaces at one side being opposite the supports of the other side, to provide a zigzag tread for the tire.

4. A wheel tire comprising a resilient body having a relatively wide base, a tread portion of less width than said base, extending centrally and continuously thereof, subject to lateral displacement when the tire is in action, supports disposed tangentially along the sides of the tire to yieldingly resist lateral distortion of the tread portion, as well as the longitudinal displacement thereof, and spaces accessible vertically from the ground immediately below and alternating with said supports along the opposite sides of said tread portion, said supports engaging the ground when the tread portion is compressed between the ground and said base.

5. A wheel tire comprising a resilient body having a base and a tread portion, and supports disposed tangentially along the sides of the tire, spaced apart to form ribs which extend from the base toward the tread surface, and arranged to engage the ground in the plane of said surface when the tire is under compression.

6. A wheel tire comprising a tread and base of resilient material, and integral ribs disposed at opposite sides of said tread, so arranged that the greater the compression of the tire upon a flat surface the greater will be the distortion of said ribs directly on said surface, the ribs at one side being inclined and non-radial when the tire is viewed from the side, and the ribs at the other side being similarly arranged relative to each other.

7. A wheel tire comprising a tread and base of resilient material, and integral ribs disposed at opposite sides of said tread, so arranged that the end of each rib adjacent the tread is subject therewith to diminution by wear from contact with the ground, the ribs at one side being inclined and non-radial when the tire is viewed from the side, and the ribs at the other side being similarly arranged relative to each other.

Signed by me at Janesville, Wis., this 11th day of Aug., 1913.

ALVARO S. KROTZ.

Witnesses:
HARRY A. MOESER,
ISABELLA ROBERTS.